UNITED STATES PATENT OFFICE.

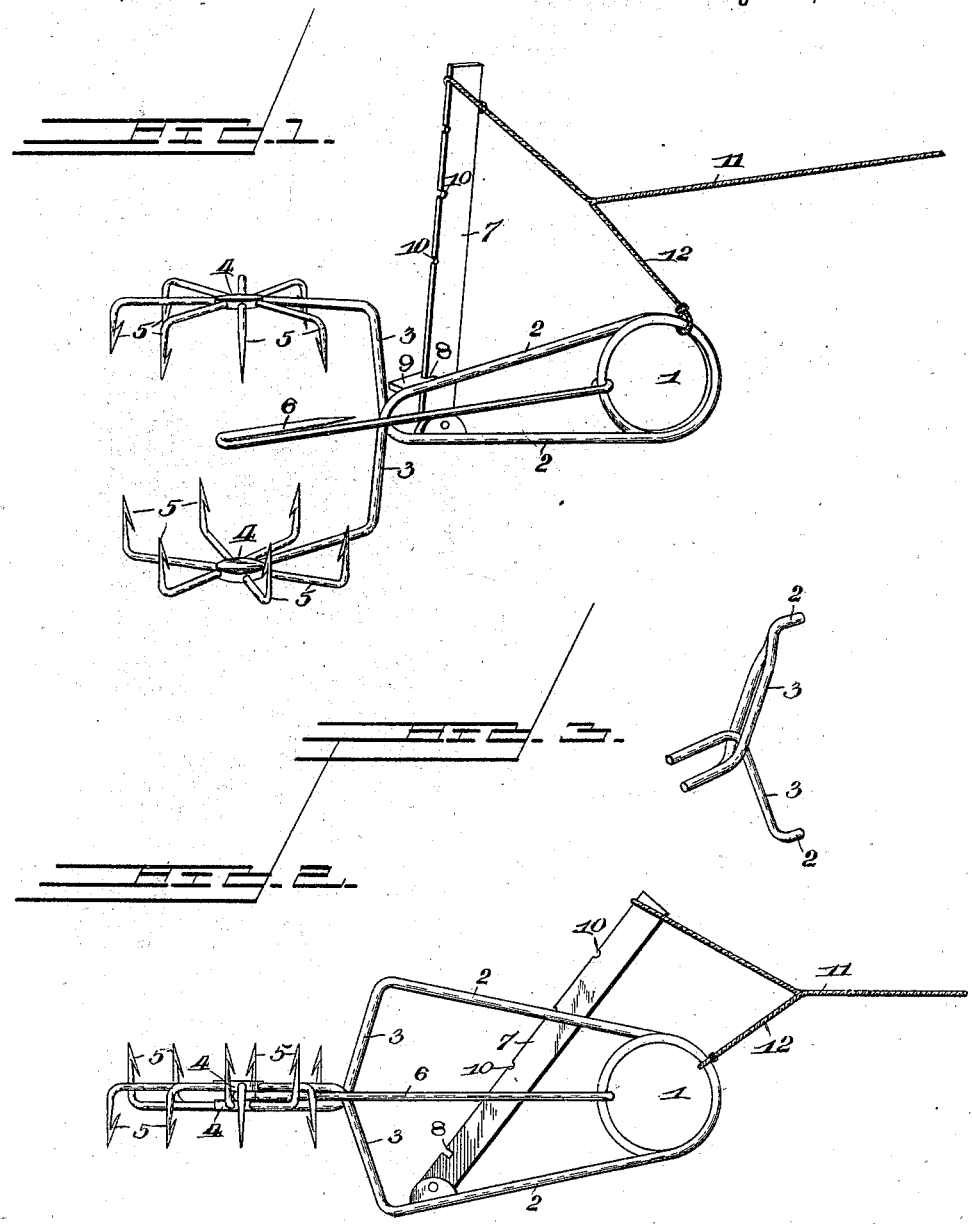

SAMUEL M. NEELY, OF SMITH'S TURN-OUT, SOUTH CAROLINA.

ANIMAL-TRAP.

SPECIFICATION forming part of Letters Patent No. 560,597, dated May 19, 1896.

Application filed June 17, 1895. Serial No. 553,109. (No model.)

*To all whom it may concern:*

Be it known that I, SAMUEL M. NEELY, a citizen of the United States, residing at Smith's Turn-Out, in the county of York and State of South Carolina, have invented a new and useful Animal-Trap, of which the following is a specification.

This invention relates to an improvement in animal-traps, and has for its object to provide a device of the nature referred to of simple, inexpensive, and efficient construction, which is adapted to be baited and anchored to a tree or other fixed support and to be sprung by the animal in his attempt to remove the bait therefrom.

The trap contemplated in this invention, while particularly designed for catching rodents and the smaller species of animals, may, when manufactured in larger sizes, be equally as well employed for entrapping wild animals of a larger size.

The invention consists in certain novel features and details of construction and arrangement of parts whereby advantages in point of simplicity and economy of manufacture are attained, as hereinafter fully described, illustrated in the drawings, and finally embodied in the claims.

In the accompanying drawings, Figure 1 is a perspective view of an improved animal-trap constructed in accordance with this invention. Fig. 2 is a side elevation of the same. Fig. 3 is an enlarged detail view showing the manner in which one of the spring-arms may be made to embrace and support the other arm.

Similar numerals of reference designate corresponding parts in the several figures of the drawings.

Referring to the drawings, the improved trap therein shown is made principally from a stout piece of spring-metal wire. This wire blank is bent at its central portion to form one or more complete coils 1, after which the terminals are extended in the same direction and at a slight distance apart to form an oppositely-disposed pair of spring-arms 2. After being extended the desired distance these arms are given a bend inwardly toward each other to form oblique or diagonally-extending portions 3, which cross each other, as shown, after which the terminals of the blank are again extended outwardly to form continuations of the spring-arms 2. The extremities of the spring-arms are each given a complete coil or loop 4, and a series of radially-projecting fingers 5 are soldered or otherwise secured to said loops, the extremities of said fingers being bent or hooked inward, as shown, and arranged to intermesh, the fingers of one spring-arm with those of the other arm.

6 designates a bait hook or rest, which is composed of a piece of wire soldered or otherwise secured at its inner end to the advance portion of one of the coils 1, the end thereof which is adapted to receive the bait being disposed between the radial fingers at the extremities of the spring-arms. By this arrangement when the trap is set and the spring-arms held apart it will be necessary for the animal to poke his head between the radial fingers in order to obtain the bait.

7 indicates the trigger, which is pivotally connected at one end to one of the spring-arms 2 and also provided near said end with a notch 8, adapted to engage a spur or projection 9 upon the opposite spring-arm for holding said spring-arms in the position shown in Fig. 1. The outer swinging end of said trigger is formed with a series of notches or indentations 10, adapted to receive an anchoring-cord 11, which may be adjusted to any one of said notches, according to the leverage which it is desired to establish for effecting the springing of the trap. If desired, the anchoring-cord may have a branch 12, extending to and connecting with the coils 1, the free end of said anchoring-cord being in practice securely tied to a tree, bush, or other fixed support near the place where the trap is set. If desired, one of the oblique or diagonally-extending portions 3 of one spring-arm may be made double or have an extra piece of wire secured thereto and extending in parallel relation therewith, sufficient space being left between the main arm and the extra wire to receive and permit the movements of the other spring-arm, the object of this construction being to impart additional strength to the device and hold the spring-arms against relative lateral play.

It will be apparent from the foregoing description that as the animal grasps the bait, which lies between the pointed fingers, and attempts to remove the same the trigger will be vibrated by reason of its being anchored in the manner described, thus springing the trap and catching the head of the animal between the oppositely-disposed radial fingers.

It will be understood that the trap described may be manufactured in different sizes and from spring wire of different gages, and that if preferred the bait hook or rest, instead of being rigidly connected to one of the coils, may be mounted loosely or pivotally connected with said coil.

Other changes in the form, proportion, and minor details of construction may be resorted to without departing from the spirit or sacrificing any of the advantages of this invention.

Having thus described the invention, what is claimed as new, and desired to be secured by Letters Patent, is—

1. An animal-trap consisting of a pair of spring-arms comprising opposing impaling-jaws and united and actuated by one or more spring-coils, a rigid bait hook or rest secured to one of the connecting-coils between said spring-arms at one end and disposed at its opposite end between the jaws, a trigger carried by one of said spring-arms and adapted to engage with the opposite arm and an anchoring-cord connected to the trigger and adapted to be attached to a fixed object, substantially as and for the purpose described.

2. An animal-trap comprising a pair of spring-arms united and actuated by one or more coils formed integrally therewith, a series of pointed and inwardly-projecting fingers secured to the free ends of said spring-arms, a trigger connected with one of said arms and formed with a notch to engage a lug or projection upon the opposite arm and also provided with a series of notches or indentations adjacent to its outer end, and an anchoring-cord connected with said trigger and adapted to be secured at its opposite end to a fixed object, substantially as and for the purpose described.

In testimony that I claim the foregoing as my own I have hereto affixed my signature in the presence of two witnesses.

SAMUEL M. NEELY.

Witnesses:
J. S. WYLIE,
H. DUFFY.